United States Patent [19]
Filz et al.

[11] 3,810,545
[45] May 14, 1974

[54] CENTRIFUGE CHROMATOGRAPHY APPARATUS AND SYSTEM

[75] Inventors: Charles J. Filz, Hamilton, Mont.; George T. Maurice, New Haven; Svein B. Rasmussen, Rowayton, both of Conn.

[73] Assignee: E. I. du Pont de Nemours and Company, Wilmington, Del.

[22] Filed: Dec. 29, 1972

[21] Appl. No.: 319,494

Related U.S. Application Data

[63] Continuation of Ser. No. 95,546, Dec. 7, 1970.

[52] U.S. Cl. ............................. 210/198 C, 210/360
[51] Int. Cl. ........................................... B01d 15/08
[58] Field of Search...... 210/31 C, 198 C, 361, 369, 210/360; 55/67; 233/26

[56] References Cited
UNITED STATES PATENTS

| | | | |
|---|---|---|---|
| 3,583,230 | 6/1971 | Patterson | 210/361 X |
| 3,250,395 | 5/1966 | Blume | 210/198 C |
| 3,300,051 | 1/1967 | Mitchell | 210/361 X |
| 3,583,627 | 6/1971 | Wilson | 210/361 X |

Primary Examiner—John Adee
Attorney, Agent, or Firm—I. Jordan Kunik

[57] ABSTRACT

Centrifugal chromatography apparatus and system wherein means are provided for initially preparing a chromatography column and subsequently transmitting a chromatography sample through said column.

5 Claims, 21 Drawing Figures

PATENTED MAY 14 1974

INVENTORS
CHARLES J. FILZ
GEORGE T. MAURICE
SVEIN B. RASMUSSEN
BY
I. Jordan Kunik
ATTORNEY

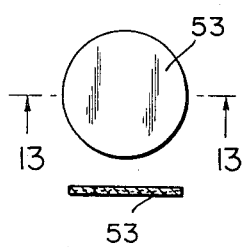
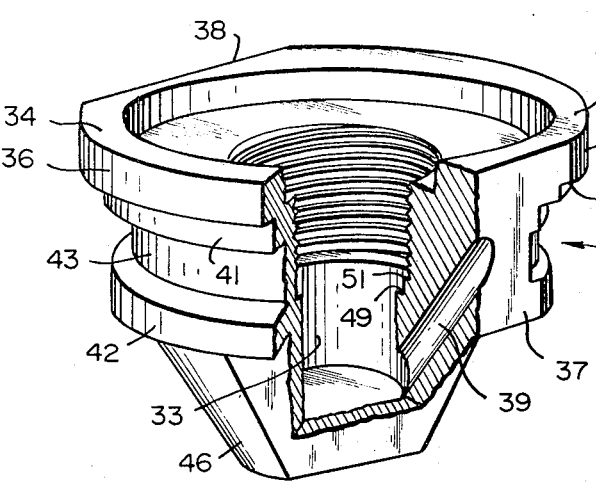
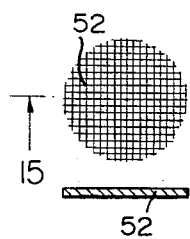
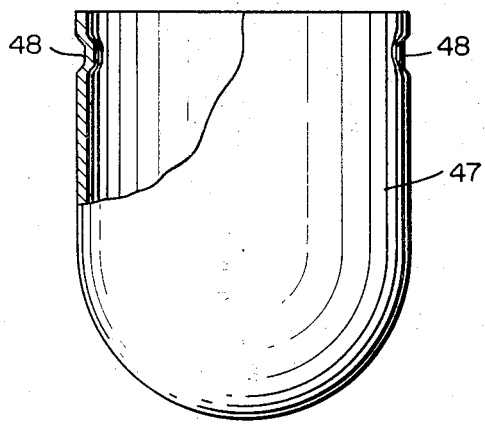
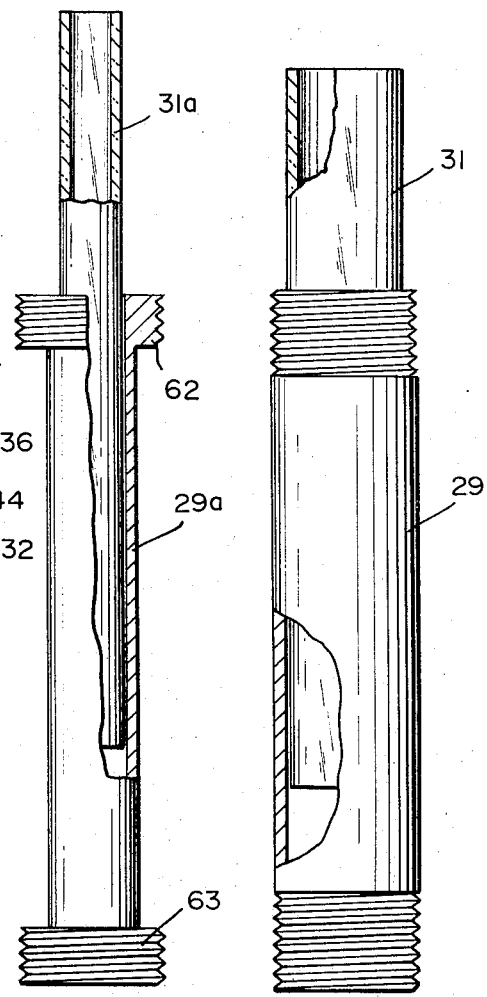
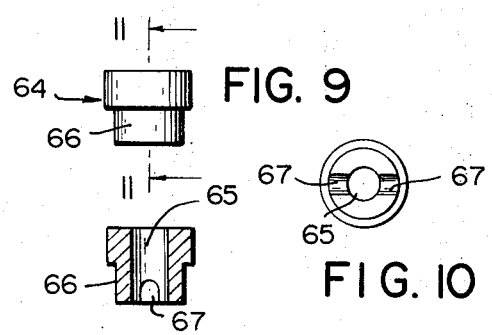

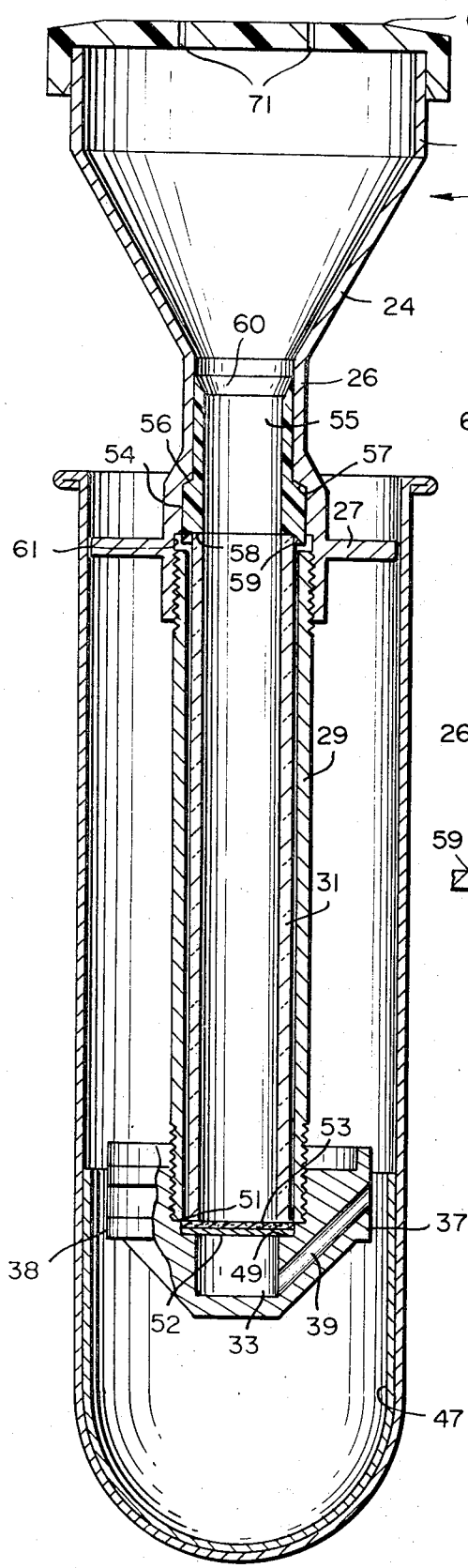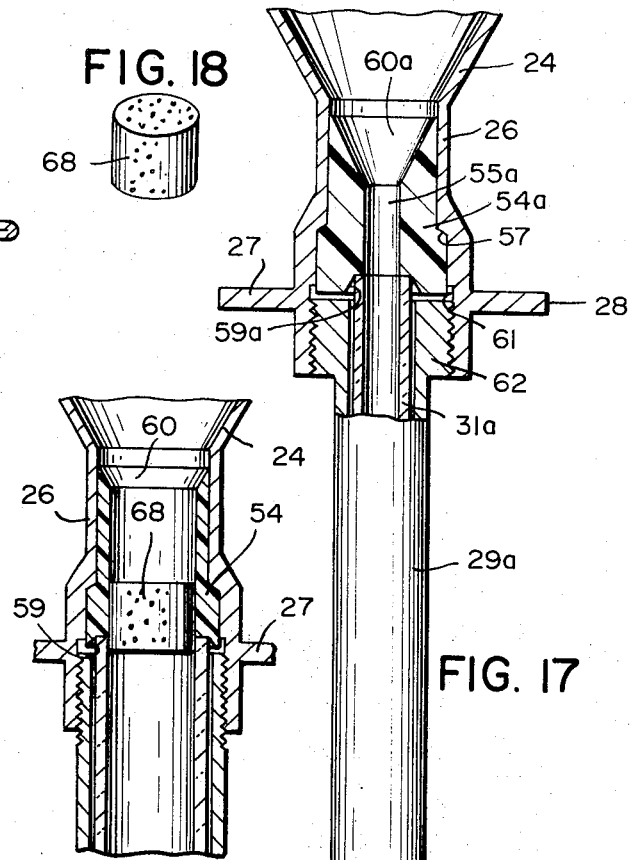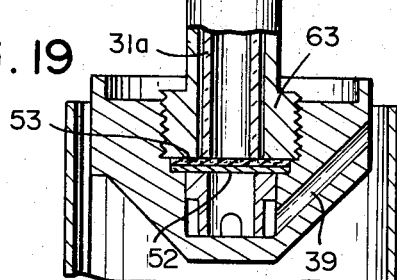

CENTRIFUGE CHROMATOGRAPHY APPARATUS AND SYSTEM

This is a continutaion, of application Ser. No. 95,546, filed Dec. 7, 1970.

BACKGROUND OF THE INVENTION

1. Field of the Invention

This invention relates to chromatography and, more particularly, to apparatus and a system for centrifugally preparing chromatograms formed in an elongated column such as homogenized microparticulate silica gel. The apparatus herein is used for qualitative and quantitative microanalytical work and for isolating individual components of biological and chemical materials.

2. Description of the Prior Art

Previous chromotographic methods have generally utilized thin layer chromatography in which the columns are "opened" to permit the use of microparticulate adsorbents. The use of such beds in classical closed column chromatography usually restricts the flow of the mobile phase to an impractical rate. Previously utilized liquid chromatographs employed fine particle columns and pressures of approximately 20,000 psi to produce analytical separations, but the apparatus necessary to prepare such columns and to contain such pressures involved complex and expensive instruments.

SUMMARY OF THE INVENTION

The foregoing disadvantages are overcome by the apparatus of the present invention wherein a single apparatus is used to perform in succession both functions of preparing the silica gel column and subsequently causing a sample to migrate through said column by use of inexpensive apparatus that is convenient and simple to handle and which furnishes reproducible results. The apparatus comprises a sleeve of tough and durable material, such as stainless steel, which encloses and supports a removable tube within which is contained the chromatographic column packing material. The chromatographic tube must be chemically inert, preferably transparent, and possibly disposable after one or more uses. Suitable materials include stainless steel, glass, quartz, and certain plastics, none of which may possess the requisite mechanical strength or toughness without the outer sleeve for support.

Connected to the upper end of the sleeve is a removable receiver for passing materials into the tube while removably connected to the lower end is a collector cap through which filtered solvent passes into a suitable removable cup. The assembly of these components is removably insertable into a swing bucket of the centrifuge referred to hereinbefore where the chromatography silica gel column is first prepared and thereafter the sample is passed through said column by centrifugation to produce a chromatogram for further study and analysis.

The components of the apparatus herein are easily assembled and disassembled to facilitate the chromatography process and to enable the separate interchangeable modular parts to be readily cleaned for successive experiments. The apparatus is arranged to fit snugly and removably in a carrier tube that can also serve as a swinging bucket suspended in a pivotable trunion ring on a centrifuge rotor. A specially arranged chamber is located at the bottom of the chromatography tube in which the chromatography process takes place in order to preserve the requisite moisture conditions therein during centrifugation. Located at the top of the apparatus is a closure cap to minimize evaporation of highly volatile solvents from the top of the column during centrifugation.

These and other novel features and advantages of the present invention will be described and defined in the following specification and claims.

BRIEF DESCRIPTION OF THE DRAWINGS

FIG. 6A is an enlarged, partly exploded elevation view, partly broken away, showing the tubular components of the apparatus herein, matching the element shown in FIG. 5A;

FIG. 6B is similar to FIG. 6A showing said alternative embodiments of the tubular elements for matching the component of FIG. 5B;

FIG. 7 is a greatly enlarged perspective view, partly broken away, of the collector gap of the apparatus herein;

FIG. 8 is an elevation view, partly broken away, of the collector cup that cooperates with the collector cap shown in FIG. 7;

FIG. 9 is an elevation view of a cap adapter located in the interior of the collector cap of the apparatus for use in conjunction with the components shown in FIG. 6B;

FIG. 10 is a bottom view of the element shown in FIG. 9;

FIG. 11 is a section view taken on line 11—11 of FIG. 9;

FIG. 12 is a plan view of the filter disc utilized in the apparatus herein;

FIG. 13 is a section view taken on line 13—13 of FIG. 12, said section view being exaggerated somewhat in thickness for purposes of illustration;

FIG. 14 is a plan view of the filter screen utilized in the apparatus herein;

FIG. 15 is a section view taken on line 15—15 of FIG. 14, the thickness of said screen being somewhat exaggerated for pusposes of illustration;

FIG. 16 is a vertical assembly view, in central cross-section, of one embodiment of the apparatus herein, some parts being broken away;

FIG. 17 is a fragmentary view similar to FIG. 16 showing an alternative embodiment of the apparatus;

FIG. 18 is a perspective view of a sample plug or loading stopper which may be used in conjunction with the apparatus; and FIG. 19 is a fragmentary portion of FIG. 16 showing the location of a sample plug inserted into the apparatus.

DESCRIPTION OF THE PREFERRED EMBODIMENTS

Figure 1:
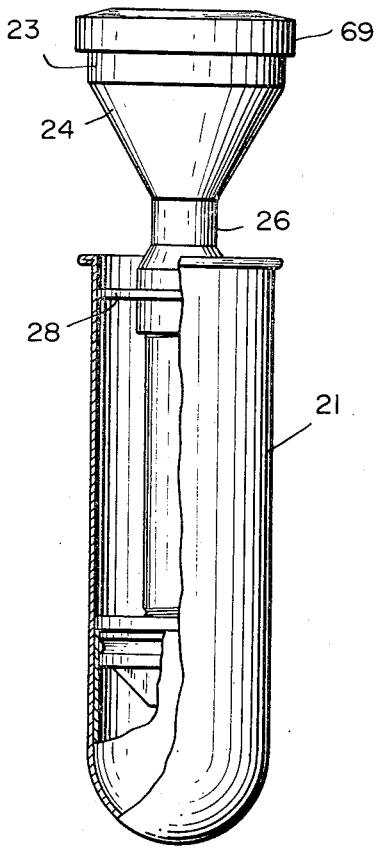
FIG. 1 is a vertical elevation, partly broken away, of the apparatus of the present invention.
Figure 2:
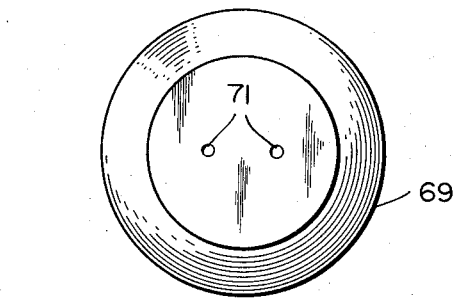
FIG. 2 is an enlarged top view of the apparatus shown in FIG. 1.
Figure 3:
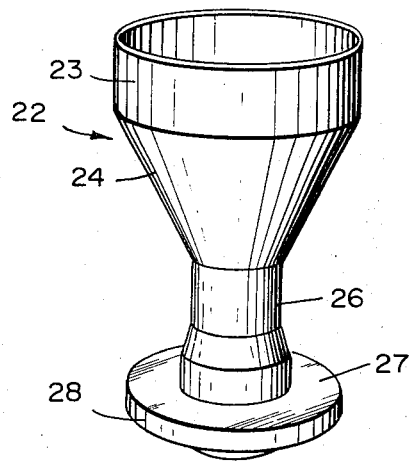
FIG. 3 is an enlarged perspective view of the funnel portion of the apparatus herein.
Figure 4:
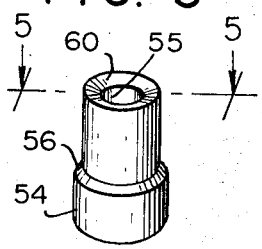
FIG. 4 is a perspective view of a loading sleeve element insertable into the neck of said funnel portion.

Referring now to the drawings in detail, the apparatus of the present invention is adapted to be inserted into a carrier tube 21, made of stainless steel or the like, which is cylindrical in shape, closed at the bottom end and open at the upper end. Said carrier with the apparatus therein is insertable into the receptacle of a swinging bucket centrifuge rotor or the like, whereby the materials in the apparatus are subjected to centrifugation at the requisite speeds. In some embodiments, carrier tube 21 may be suspended by means of the integral outwardly extending flange at its upper end in a pivotable trunion ring on a centrifuge rotor whereby said carrier tube acts as the swinging bucket itself.

The upper portion of the apparatus comprises a receiver, generally designated 22, made of stainless steel or the like, having an upper cylindrical rim 23, the bottom of which merges with a downwardly extending funnel 24 which terminates in a cylindrical neck 26. Located near the lower portion of neck 26 is an outwardly extending, integrally formed flange 27, the peripheral surface 28 of which is suitably knurled for facilitating manipulation thereof. The outside diameter of flange 27 is very slightly smaller than the inside diameter of carrier tube 21 and is slidable with a snug fit relative thereto without any frictional resistance. Flange 27 serves to locate receiver element 22 coaxially relative to the axis of carrier tube 21.

The interior of the lower portion of neck 26 below flange 27 is threaded to cooperate with the threaded upper end of an elongated rigid cylindrical sleeve 29 made of stainless steel or the like. See FIGS. 6A and 16. Slidably located within sleeve 29 is a cylindrical column tube 31 made of a suitable material such as Pyrex, fused quartz, or the like, which is transparent or translucent. The outside diameter of column tube 31 is very slightly less than the inside diameter of sleeve 29 whereby said column is not only readily movable longitudinally relative to said sleeve, but also is mechanically aligned by said sleeve in the threaded assembly and subsequent centrifugation of the complete apparatus.

Located at the lower end of sleeve 29 is a collector cap, generally designated 32, made of stainless steel or the like, said cap having a central chamber 33, the upper portion of which is threaded to engage the lower threaded end of sleeve 29. See FIGS. 7 and 16. The upper portion of collector cap 32 terminates in a pair of outwardly extending arcuate flanges 34 whose peripheral surfaces 36 form a sliding close fit with the interior surface of carrier tube 21. Except for opposing parallel, vertical flats or walls 37 and 38, collector cap 32 is generally circular in shape.

Extending obliquely through collector cap 32 is an overflow channel 39 arrayed at an angle relative to the axis of tube 31, the lower portion of said channel communicating with the lower portion of chamber 33, the upper end thereof terminating at wall 37. The upper end of channel 39 is located in approximately the same plane with the upper portion of chamber 33 whereby overflow through channel 39 will occur only when chamber 33 is full. Channel 39 may also be curved or otherwise shaped, and arrayed in any suitable manner provided its upper exit port is in a location where, during centrifugation, chamber 33 will be filled with liquid before overflow through said channel takes place.

The respective arcuate portions of collector cap 32 between walls 37 and 38 have identical integrally formed spaced apart paired flanges 41 and 42 which bound identical arcuate recesses 43. Formed between flanges 34 and 41 are identical arcuate shoulders 44. The bottom of collector cap 32 is formed in a truncated cone 46.

A cup-like tubular fraction collector or overflow cup 47, formed of stainless steel or the like, is removably insertable into and is shaped to nest in the rounded lower end of tube carrier 21 with a snug fit. See FIGS. 8 and 16. Formed integrally near the upper edge of fraction collector 47 are a pair of inwardly extending dimples 48 that are disposed approximately 180° apart from each other. Fraction collector 47 is releaseably connectable to collector cap 32 by the interaction of dimples 48 and recesses 43, said collector being moved into conjunction with said collector cap by causing dimples 48 to move upwardly in the region of walls 37 and 38, and subsequently rotating fraction collector 47 to cause said dimples to slidably engage respective recesses 43 in the manner of a bayonet mount. Thus, when the apparatus is lifted from tube carrier 21, fraction collector 47 will also be removed simultaneously therewith.

Formed in the interior of chamber 33 of collector cap 32 and intermediate the upper and lower ends of said chamber are a pair of coaxially arrayed and vertically spaced apart annular shoulders 49 and 51, the diameter of the latter being somewhat greater than the diameter of the former. (See FIGS. 7, 16 and 17) Resting upon shoulder 49 is a circular, thin, filter screen 52 made of stainless steel and having evenly distributed, closely spaced apertures of approximately 0.005 to 0.007 inches in diameter. (See FIGS. 14 and 15) Resting on top of filter screen 52 is a filter disc 53 made of chromatography filter paper such as, for example, Whatman No. 1. (See FIGS. 12, 13, 16, 17). Both filter screen 52 and filter disc 53 are substantially equal in diameter and are replaceably insertable into chamber 33 to rest together on shoulder 49.

When sleeve 29 is threadably inserted into the central axial chamber 33 of collector cap 32, the bottom end of said sleeve abuts annular shoulder 51, while the lower edge of column tube 31 in the interior of sleeve 29 abuts a circular portion of filter disc 53 and is supported by annular shoulder 49. The abutment of the lower end of column tube 31 forms a liquid-tight seal around the periphery of said filter disc. Furthermore, since filter disc 53 is made of fibrous material such as paper or the like, it is somewhat compressible and serves to compensate for any dimensional irregularities or imperfections that may exist at the abutting lower edge of column tube 31.

Removably insertable into the interior of neck 36 of receiver 22 through the bottom thereof is a tubular loading sleeve 54, made of a suitable material such as high density polyethylene. Sleeve 54 has a cylindrical axial aperture 55 intermediate its ends. An external, slightly downwardly sloping annular shoulder 56 is formed intermediate the ends of sleeve 54, said shoulder abutting upwardly against a corresponding slightly sloping annular shoulder 57 formed in the interior surface of neck 26 of receiver 22. The slight slope or bevel of said shoulder facilitates easy and rapid insertion of said loading sleeve into said receiver. The interior of the bottom portion of sleeve 54 has an annular recessed shoulder 58 which is bounded by an annular beveled slope 59. The upper end portion of loading sleeve 54 has an internal annular beveled slope 60 whose angle from the vertical axis of said sleeve is somehwat smaller than the slope of angle of funnel 24 of receiver 22, the reason for which will be explained hereinafter.

In one embodiment of the present invention, column tube 31 is arranged to be slightly longer than sleeve 29. After said column and said sleeve are threadably secured into firm engagement with collector cap 32, and the upper end of sleeve 29 is threadably inserted into the bottom portion of neck 26, the upper end portion of tubular column 31 will extend somewhat above the upper end of sleeve 29. By its upward movement and guided by slope 59, the upper edge of said column abutting internal shoulder 58 will cause external shoulder 56 of loading sleeve 54 to be urged firmly upwardly against internal shoulder 57 in neck 26.

Since sleeve 29 is shorter than column tube 31, the procedure of threadably inserting the upper end of said sleeve into the bottom threaded portion of receiver 22 ensures that the upper end of tube 31 will be forcibly urged upwardly against loading sleeve 54. Also, slight variations in the length of tube 31 are compensated for since there is no abutment of the upper end of sleeve 29 against any barrier since the threading engagement of said sleeve with the threaded bottom portion of receiver 22 is prevented by the abutment of the upper end of tube 31 against shoulder 58 of loading sleeve 54.

The external contour of loading sleeve 54 is arranged to form a smooth close sliding fit with the interior contour of neck 26. Thus, when column 31 is urged upwardly against loading sleeve 54, there is formed a liquid-tight seal between the upper edge of column tube 31 and shoulder 58 so that fluids, dispersions, and other materials flowing downwardly through receiver 22 will be directed through column tube 31 without any leakage.

In some embodiments, it may be possible to dispense with inner tube 31, and alternatively produce the chromatogram in stainless steel sleeve 29 which would have an inside diameter equal to the inside diameter of loading sleeve 54. It is preferable, however, to utilize tube 31 because of its being transparent or translucent so that the progress or results of the preparatory and analytic procedure may more readily be observed.

In the region of the lower edge of loading sleeve 54, neck 26 has a thread relief and proves an annular space 61 which permits the upper end portion of sleeve 29 to move a sufficient distance relative to the threaded portion of neck 26 in order to permit the upper edge of tubular column 31 to extend upwardly a sufficient distance to urge the loading sleeve 54 into the desired leak-tight location within neck 26.

In the foregoing discussion, reference has been made to the embodiment of sleeve 29 and column tube 31 wherein the latter may have an inside diameter of approximately 8 mm., for example, when a chromatography column of that diameter is to be utilized in the experiment or analysis. In some cases, however, it is desirable to utilize a chromatography column of a different diameter and the present invention is arranged so that most of the same components of the apparatus can be used with the substitution only of sleeves and tubes of suitably different diameters.

Accordingly, as shown in FIGS. 6B and 17, a sleeve 29a having a diameter smaller than that of sleeve 29 in FIG. 6A, is utilized. Formed on the upper and lower ends of sleeve 29a and made of stainless steel or the like, are identical threaded flanges 62 and 63, the diameter of said flanges being equal to the diameter of the threaded end portions of sleeve 29 whereby said flanges 62 and 63 are threadably engageable, respectively, with the threaded lower portion of neck 26 and the threaded upper portion of chamber 33 of collector cap 32. Also slidably insertable into sleeve 29a is a cylindrical column tube 31a made of the same material as column tube 31 and having an inside diameter of 3 mm., for example.

Figures 5A, 5B:
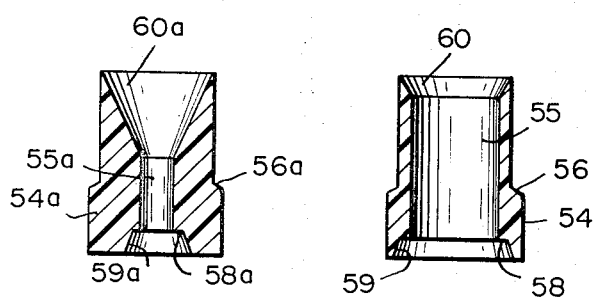
FIG. 5A is an enlarged vertical section view taken on line 5—5 of FIG. 4.
FIG. 5B is similar to FIG. 5A showing an alternative embodiment of the same component part.

In order to accommodate the smaller diameter sleeve 29a and column tube 31a shown in FIG. 6B, an alternate loading sleeve 54a is provided, the external dimensions and contour of which are identical with loading sleeve 54 and having a similar abutting annular slope 56a. See FIG. 5B. The central cylindrical aperture of loading sleeve 54a has the same inside diameter as the inside diameter of column tube 31a. Furthermore, the annular abutment shoulder 58a has a diameter of column 31a. The bottom portion of loading sleeve 54a also has an annular beveled slope 59a to receive the upper end of column 31a and to guide it centrally into coaxial alignment with the central cylindrical aperture of loading sleeve 54a. Also the upper portion of loading sleeve 54a has a funnel-shaped annular slope 60a, the angle of which is slightly smaller than the slope angle of funnel 24 of receiver 22. This smaller angle, i. e., steeper slope, ensures that the slurry mix added to receiver 22 slides smoothly into the column tube 31 and gives uniform packing of the chromatographic column.

In order to provide support for the lower end of column tube 31a, since no change is made in the structure of collector cap 32, a tubular cap adapter 64 is utilized, having an axial aperture 65, and made of stainless steel or the like (FIGS. 9, 10 and 11), said adapter being removably insertable into and resting within the lower portion of chamber 33. See FIG. 17. The circular periphery of the upper portion of cap adapter 64 forms a close sliding fit with the circular wall of chamber 33. The upper end of cap adapter 64 coincides with the level of annular shoulder 49 whereby the upper surface of said adapter and said shoulder form a flat annular support for filter screen 52 and filter disc 53. The inside diameter of cap adapter 64 is smaller than the outside diameter of the lower end of column tube 31a whereby, when the latter is urged downwardly, said cap adapter provides a firm abutment support for said column.

The lower portion 66 of cap adapter 64 has a smaller diameter than the upper portion thereof while the bottom portion thereof has a pair of upwardly extending channels 67 formed therein and positioned 180° apart to permit fluid passing downwardly through aperture 65 to flow into the lower portion of chamber 33 of collector cap 32. The smaller diameter portion 66 also provides an annular space for fluid to flow freely within the lower portion of chamber 33 and for excess fluid to flow upwardly and outwardly from said chamber through channel 39 into fraction collector 47 when the apparatus is subjected to centrifugation.

As was the case in the embodiment of FIGS. 6A and 16, here also in the embodiments of FIGS. 6B and 17, column tube 31a is slightly longer than sleeve 29a whereby, in assembling the apparatus, the upward movement of the upper end of tube 31a causes the firm engagement of loading sleeve 54a into neck 26 in the same manner as described in connection with FIGS. 6A and 16.

Used in conjunction with the apparatus herein is a loading stopper or sample plug 68 made of porous polyethylene, as shown in FIG. 18. Plug 68, which is utilized in conjunction with the embodiment in FIG. 16, is cylindrical in shape and its diameter is such as to form a smooth sliding fit into the axial aperture 55 of loading sleeve 54. The manner in which sample plug 68 is utilized in conjunction with loading sleeve 54 and the function of said plug in the process performed by the apparatus herein will be described hereinafter. It is understood that a sample plug similar to plug 68 but having a smaller dimension conforming to the axial aperture 55a of loading sleeve 54a (FIGS. 5B and 17) can be utilized when the smaller column tube 31a is employed in the apparatus.

OPERATION

The apparatus herein is designed, generally, for use in a swinging bucket centrifuge such as disclosed in a co-pending U.S. patent application entitled, "Swinging Bucket Centrifuge Rotor," filed Oct. 20, 1969, Ser. No. 867,566. Tube carrier 21 with the assembly therein of funnel 24, sleeve 29, column 31, collector cap 32, and fraction collector 47, is inserted into a corresponding swinging bucket of said rotor.

The procedure for obtaining a chromatogram involves the preliminary step of preparing a suitable slurry by mixing microparticulate materials such as alumina, magnesium oxide, cellulose, or precipitated silica, such as Quso G32, made by Philadelphia Quartz Co., Chester, Pa., with an appropriate organic solvent such as benzene, by means of a high speed mixer until a homogenous gal is produced. In some cases, 1.5 g. of silica is used for each 40 ml. of solvent. The slurry is then introduced into receiver 22 of the assembled apparatus by means of a suitable syringe and cannula, after which cover cap 69 made of a suitable material such a medium density polyethylene or the like, is snapped over the top of rim 23 of receiver 22 thereby making a substantially closed system of the apparatus herein. Cap 69 minimizes evaporation of solvent from the slurry. In some embodiments, however, one or more small holes 71 in the top of cap 69 may be provided to act as relief ports during centrifugation so as to prevent cap 69 from being blown off or ejected from receiver 22. Cover cap 69 also prevents excessive evaporation of the solvent during centrifugation and prevents undue aeration in samples that may subsequently be centrifuged within the apparatus.

After the assembly is placed into the swinging bucket of the rotor and the latter is caused to rotate, the slurry is driven down into and becomes packed into column 31 by centrifugation, usually at 1,500 X G, for about four to seven minutes. The densely packed silica gel column is supported in column 31 by means of screen 52. Filter disc 53 prevents silica gel from passing out of column 31 while, at the same time, it permits solvent to flow therethrough into chamber 33 while excess solvent flows through channel 39 into fraction collector 47.

The bottom portion of chamber 33 ensures that a residual amount of solvent will remain therein to prevent undue drying of the silica gel column while, at the same time, excess solvent will be permitted to escape through channel 39 into fraction collector 47. By arranging for the small size of the bottom of chamber 33 and the reverse oblique channel 39, only a small amount of solvent is retained in said chamber whild the larger excess quantity is automatically removed and transferred into collector 47 which can thereafter be readily removed from the collector cap in order to spill out or otherwise dispose of said excess solvent.

After preparatory centrifugation, column 31 contains a translucent column of densely and uniformly packed moist column or stick of silica gel. The assembled apparatus is then removed from tube carrier 21 and receiver or filling head 22 is removed from sleeve 29.

For the next analytical step of the process herein, the sample that is to be centrifuged through the column within column tube 31 may be placed upon the top of said chromatogram column by any one of several suitable procedures. When receiver 22 has been removed from sleeve 29, the upper end of the silica gel column is approximately co-terminous with the upper end of column tube 31. According to one procedure, a metal rod of suitable diameter may be pressed down upon the top of the silica gel column to a distance of approximately 4 mm., to displace a sufficient amount of gel to provide a space to receive the lower end of the porous polyethylene loading stopper 68 which has been saturated with the sample solution before it is inserted. See FIG. 19. In larger diameter columns, it may be necessary to replace the top of the packed silica gel column with a porous polyethylene plunger to provide an even surface for making total contact with the loading stopper in order to ensure that the migration pattern of the sample through the silica gel column will not be erratic.

According to an alternative procedure, sample plug or loading stopper 68 may be dispensed with, and the sample can be applied carefully directly upon the top of the silica gel column by means of a syringe or cannula.

In this procedure, the top of the silica gel column within column tube 31 may be removed a short distance below the upper edge of said tube by means of a suitable rod or the like in order to provide a reservoir for the liquid sample.

With the sample in place on top of the silica gel column, either within the sample plug 68 or in a small pool on top of the gel column, a fresh and clean filling head 22 containing fresh and clean loading sleeve 54, is threadably applied upon sleeve 29 and the filling head is filled with an appropriate developing solvent such as benzene. This procedure is performed quickly in order to prevent drying of the sample and of the silica gel column. Cap 69 is replaced over the top of the filling head 22 and the assembly is returned to the swinging bucket of the centrifuge rotor wherein it is again centrifuged under predetermined conditions, usually 1,500 to 2,500 X G, for a period of time required to achieve the desired migration of the sample through the silica gel column.

During centrifugation of the sample through the silica gel column, the developing solvent passes into the lower portion of chamber 33, and the excess over that which is required to maintain the chromatogram is expelled by virtue of centrifugal action through channel 39 into fraction collector 47. The provision of collector cap 32 which has a small, separate receiving chamber 33 from which excess solvent can be expelled, renders the apparatus herein more efficient and ensures that only a controlled amount of solvent will be retained at the lower end of the chromatography column during centrifugation to maintain the requisite moisture condition in the column. Otherwise, an excess of such solvent in a large receptacle without the escape passage 39 would interfere with the proper migration of the sample through the chromatography column.

The singular arrangement of chamber 33 and channel 39 provides that during centrifugation there will be a continual migration of the sample through the chromatography column within tube 31 without any danger of any back pressures that might otherwise be induced by the collection of solvent in a container of different design. The fraction collector 47 serves as an overflow reservoir which has ample capacity to ensure that no back-up of the solvent will occur into the chromatography column in tube 31 during centrifugation. Thus, a high degree of control is achieved by the particular arrangement and structure of collector cap 32 and its cooperation with fraction collector 47. In some processes, fraction collector 47 may be used as a receptacle to retrieve various separate component fractions of materials carried through the chromatography column by the liquid solvent for separate analysis.

As indicated hereinbefore, the exit port of overflow channel 39 is substantially in the same plane with the upper end portion of chamber 33 or in a suitable location whereby overflow of effluents will take place only when chamber 33 is substantially full of liquid, said overflow moving in a direction generally opposite the centrifugal force that is applied to said apparatus but at an angle thereto. In other embodiments, channel 39 may be formed in other suitable contours and shapes provided that the exit port thereof is displaced laterally from said chamber and is located in a position where overflow will take place only when chamber 33 is full of liquid which maintains the requisite moisture conditions for the chromatograms within tubes 31 and 31a.

After centrifugation has been completed, the assembly is removed from the centrifuge rotor, filling head 22 is removed from the upper end of sleeve 29, collector cap 32 is removed from the lower end of sleeve 29, column tube 31 is slidably removed from sleeve 29, and the completed chromatography silica gel column is extruded from column tube 31 by appropriate means such as pressing a metal rod through the upper end of column tube 31.

Although the extrusion of the completed chromatography silica gel column may be readily accomplished from a column tube 31 of uniform diameter throughout, it is also contemplated that in some embodiments the inside diameter of column tube 31 may be tapered so that the inside diameter at its lower end is slightly greater than the inside diameter at its upper end whereby extrusion of the chromatography column is facilitated. It is a part of the present invention to provide for such a tapered column notwithstanding the fact that the slope of said inside diameter is so slight as not to be capable of visual illustration in the drawings. It is to be understood that in some embodiments both column tubes 31 and 31a are provided with tapered inside diameters.

While a filter disc 53 and a support filter screen 52 are disclosed and described herein for supporting the silica gel column and for filtering the solvent while retaining the silica gel within tube 31, it is understood that equivalent means for performing the same filter and support function may be provided by inserting a short filter plug in the lower end of tube 31, said plug being made of substantially the same material as sample plug 68. The extruded column is then oven-dried at a suitable temperature and thereafter an indicator or reagent of the requisite type is applied to the column to render visible the separated components of the sample that have migrated through the column during centrifugation. After proper standards have been established, observation of the separate component bands that appear on the column and of their respective densities makes possible the identification of various steroids in a sample, of various plasma lipids, and constituents of other biological materials, bioassays, and the like.

Although the present invention has been described with reference to particular embodiments and examples, it will be apparent to those skilled in the art that variations and modifications can be substituted therefor without departing from the principles and true spirit of the invention. The "Abstract" given above is for the convenience of technical searchers and is not to be used for interpreting the scope of the invention or claims.

We claim:

1. Centrifugal chromatography apparatus for producing a chromatogram comprising an elongated support sleeve, a tubular receiver assembly removably connected to the upper end of said sleeve, a collector element removably connected to the lower end of said sleeve, a chromatogram column tube removably positioned coaxially within said sleeve and aligned axially with said receiver assembly, said receiver assembly being insertable into a bucket of a swinging bucket centrifuge rotor during the rotation of which fluid passes from the top to the bottom of said tube, a chamber in said collector element located axially at the bottom of said tube to receive fluid passing therethrough, a channel in said collector element, the inner end of said channel communicating with the bottom portion of said chamber, the outer end of said channel communicating with the exterior of said collector element and being located in a position above the bottom portion of said chamber whereby a quantity of said fluid is retained in said chamber when said apparatus is subjected to centrifugal action to preserve the moisture in the chromatogram being formed in said tube, said channel being arrayed at an angle relative to the axis of said tube whereby fluid transmitted by centrifugal force through said tube into said chamber is retained therein and surplus fluid from said chamber passes by reverse flow through said channel and is expelled from said apparatus only when said chamber is full of fluid.

2. Apparatus according to claim 1 and further comprising a cup shaped fraction collector cap removably attached to said collector element for receiving effluents from said channel.

3. Apparatus according to claim 1 wherein said channel transmits fluid therethrough in a direction generally opposite to that of the centrifugal force that is applied to said apparatus and at an angle relative thereto.

4. Apparatus according to claim 1 wherein the exit port of said channel is displaced laterally from said chamber and is located in approximately the same plane with the upper portion of said chamber, said channel transmitting fluid therethrough in a direction generally opposite to that of the centrifugal force that is applied to said apparatus.

5. Apparatus according to claim 1 wherein the exit port of said channel is displaced laterally from said chamber and is located in a position relative to the upper portion of said chamber to permit effluents to pass therefrom only when said chamber is full of fluid.

* * * * *